US005356366A

United States Patent [19]

Stahl

[11] Patent Number: 5,356,366

[45] Date of Patent: Oct. 18, 1994

[54] PROCESS FOR THE OPERATION OF A PUSHER CENTRIFUGE

[76] Inventor: Werner Stahl, Stalbühlweg 8, D-6740 Landau, Fed. Rep. of Germany

[21] Appl. No.: 768,062

[22] PCT Filed: Oct. 18, 1990

[86] PCT No.: PCT/EP90/00583

§ 371 Date: Oct. 11, 1991

§ 102(e) Date: Oct. 11, 1991

[87] PCT Pub. No.: WO90/11834

PCT Pub. Date: Oct. 18, 1990

[30] Foreign Application Priority Data

Apr. 13, 1989 [DE] Fed. Rep. of Germany ....... 3912207
Apr. 3, 1990 [DE] Fed. Rep. of Germany ....... 4010748

[51] Int. Cl.$^5$ ...................... B01D 21/26; B01D 33/06; B01D 43/00

[52] U.S. Cl. .......................................... 494/37; 494/6; 494/10; 494/36; 210/376

[58] Field of Search ......................... 494/1, 5, 6, 7, 10, 494/36, 50, 51, 56, 37; 210/360.1, 369, 372, 374, 375, 376, 391, 396, 402

[56] References Cited

U.S. PATENT DOCUMENTS

| | | | |
|---|---|---|---|
| 2,685,370 | 8/1954 | Rüegg | 210/377 |
| 3,063,981 | 11/1962 | Cochrane, III et al. | 210/376 |
| 3,463,316 | 8/1969 | Fierstine | 210/376 |
| 3,585,132 | 6/1971 | Rüegg | 210/376 |
| 3,623,657 | 11/1971 | Trump | 494/5 |
| 4,138,332 | 2/1979 | Schoffel | 494/37 |
| 4,434,052 | 2/1984 | Mülhaupt | 210/376 |
| 4,749,486 | 6/1988 | Yaoxin et al. | 210/374 |
| 5,021,158 | 6/1991 | Schiele | 494/36 |

*Primary Examiner*—David A. Scherbel
*Assistant Examiner*—Reginald L. Alexander
*Attorney, Agent, or Firm*—Mason, Fenwick & Lawrence

[57] ABSTRACT

A pusher centrifuge, in which the pusher plate is moved cyclicly relative to a perforated drum in the axial direction in an advanced and a retracted position in a forward or a reverse movement, can be operated with a higher throughput if the drum is supplied with the mixture after leaving the advanced position of the pusher plate and up to the start of the following forward movement of said pusher plate. The mixture throughput can also be increased in that a smaller mixture quantity is supplied to the drum before reaching the advanced pusher plate position than after leaving the advanced pusher plate position.

2 Claims, 4 Drawing Sheets

PROCESS FOR THE OPERATION OF A PUSHER CENTRIFUGE

Figure 1:
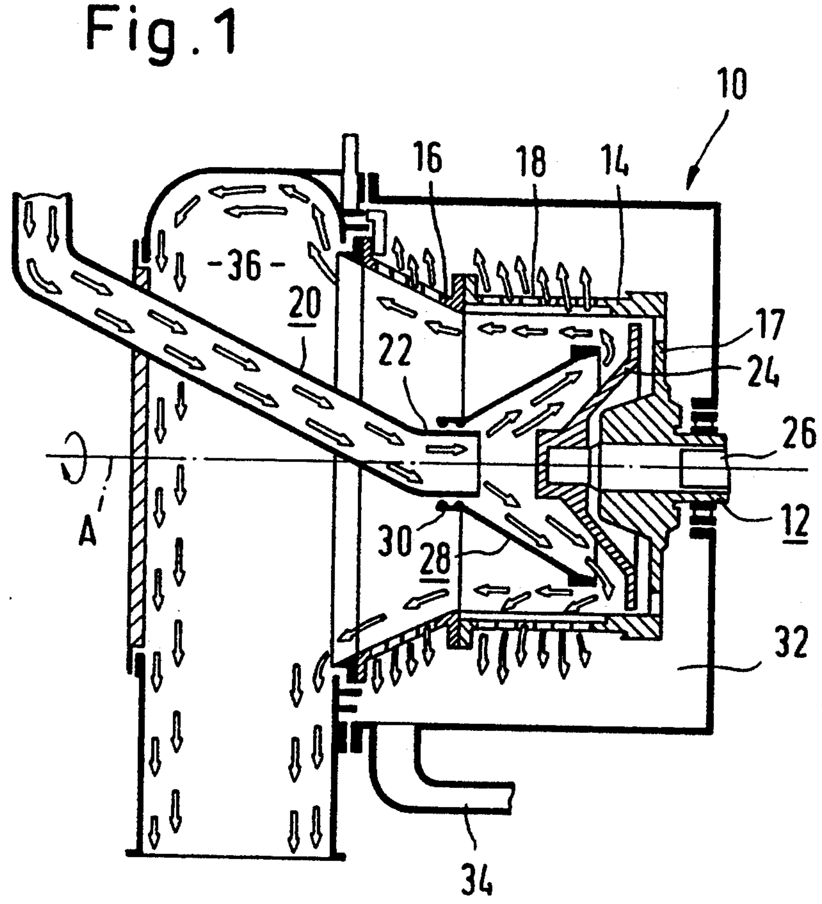

The invention relates to a process for the operation of a pusher centrifuge, in which a pusher plate is cyclicly moved relative to a perforated drum or basket in the axial direction between an advanced and a retracted position in a forward or reverse movement, the pusher centrifuge being discontinuously supplied with a material mixture in synchronous manner with the pusher cycle of the pusher plate and a solid cake is formed on the perforated drum.

DE-OS 19 39 211 discloses a pusher centrifuge, which has two centrifugal drums and in which the pusher members are moved cyclicly relative to the drums axially between an advanced and a retracted position. In the case of said pusher centrifuge fresh centrifugal material is constantly supplied by means of a pipe and is fed into one or other of the centrifugal drums. With respect to each drum, the fresh centrifugal material is supplied during the return movement of the particular pusher plates, beginning in the furthest forward position of the plates and continuing to their furthest rearward position. Thus, two feed zones of the pusher centrifuge are alternatively supplied with fresh centrifugal material.

It is disadvantageous in said pusher centrifuge that the solid cake dehumidified in the inner drum is initially pushed onto the outer drum and is not immediately supplied to a solid receiving area. Thus, on the outer drum the dehumidified solid cake is again moistened by the supply of fresh centrifugal material and must then be dehumidified again prior to the supply to the solid collecting area. Thus, there is no high dehumidified solid throughput. In addition, in said pusher centrifuge, the construction is complicated due to the use of two drums and two feed hoppers, so that it is expensive and fault-prone.

DE-OS 31 04 635 discloses a filling device for centrifuges, in which a pusher plate is moved relative to a drum constantly and in the axial direction between an advanced and a retracted position. The supply to the centrifugal drum is stopped during the forward movement of the pusher plate and before reaching the furthest forward plate position. At the start of the return movement of the pusher plate the supply of the fresh centrifugal material to the drum is recommenced, supply also taking place when the pusher plate has reached its completely retracted position. Consequently the drum is supplied with fresh centrifugal material on leaving the advanced position of the pusher plate and continues over and beyond the plate retracted position until, on its way to a completely advanced position, the pusher plate again interrupts the centrifugal material supply.

It is disadvantageous in said pusher centrifuge that the pusher plate does not completely strip off the solid cake being formed during its forward movement and instead zonally pushes said cake in front of it until the solid cake end has reached the drum end. However, during the forward movement of the pusher plate, the pressure rise only starts after a certain distance when the solid cake has already accumulated. Due to the very short pusher plate travel with respect to the drum length a reliable forward movement of the solid cake is not ensured, i.e. the cake will always increasingly accumulate. The consequence of the accumulation of the solid cake is that on the one hand the desired solid cake quantity is not pushed away from the drum and on the other the desired dehumidification in the rear drum area is no longer achieved, because the solid cake quantity significantly increases as a result of the accumulation and a low residual humidity level can no longer be achieved.

The object of the invention is to provide a process making it possible to obtain a particularly high mixture throughput with low residual humidity.

According to the invention this object is achieved in that at least most of the material mixture is only supplied when the pusher plate has commenced the reverse movement from the advanced position, that the mixture supply is completely ended by a material-dependent rest period prior to the time at which the pusher plate has commenced the forward movement from the retracted position and that the predeterminable rest period is so set as a function of the characteristics of the material mixture, that the solid cake has assumed such a high shear strength due to partial dehumidification, that the solid cake is slid down from the perforated drum by the pusher plate without significant compression.

There can be extensive dehumidification of the solid cake because, according to the invention, the pusher centrifuge drum is only supplied with mixture after leaving the forward dead centre of the pusher plate and only up to a certain time before the start of the following forward movement of said plate. The rest period for the solid cake make available through the invention enables said cake to correspondingly drain, so that the solid cake can correspondingly solidify. Therefore the solid cake is not compressed by the pusher plate and is instead slid from the drum as a block. The fed flow is inventively interrupted in good time so that prior to the start of the sliding of the solid cake it has had time to drain and consequently has achieved the necessary strength.

In the inventive process discontinuous mixture supply is understood to mean that the mixture is not supplied constantly to the pusher centrifuge, but only in certain positions of the pusher plate or at a specific times. Thus, there are phases when mixture is supplied to the pusher centrifuge and phases where no mixture supply takes place. A cycle of the pusher plate is the period when said plate performs a constantly repeating movement between the advanced position, the so-called forward dead centre and the retracted position, i.e. the so-called rear dead centre. Thus, for example, a cycle in this case starts from the forward movement of the pusher plate up to the forward dead centre and the following reverse movement of the pusher plate to the rear dead centre and optionally up to the renewed forward movement of the pusher plate, if the pusher plate e.g. does not perform immediately a renewed forward movement at the rear dead centre and instead is located for a certain rest period in the rest position at the rear dead centre.

It is particularly advantageous that the total quantity of the material mixture is only supplied when the pusher plate has commenced the reverse movement from the advanced position, that in a pusher centrifuge mode, in which the pusher plate continuously performs one movement cycle after the after and between the reversal points is constantly in motion, material mixture supply is commenced when the pusher plate has covered one third of the path of its reverse movement and the supply of the material mixture is ended when the pusher plate has covered two thirds of the path of its reverse movement. In this phase the reception capacity of the pusher centrifuge drum is particularly high and the solid cake applied has a sufficient dehumidification time to achieve the necessary strength.

The solid cake can be slid from the drum particularly well in the case of a saturation (S) of 0.7 to 0.9 S (The pore volume is filled with water for a saturation of S=1).

Accordingly to a particularly preferred embodiment of the inventive process the pusher plate remains in a retracted position during the mixture supply. In this position the solid cake has the necessary time for draining, so as to achieve an adequate strength on the part of the cake on the drum.

An optimized use can be achieved in that prior to reaching the forward dead centre of the pusher plate a mixture supply is brought about. However, the quantity of mixture supplied before reaching the forward dead centre of the pusher plate and beyond the same must be smaller than the quantity subsequently supplied to the drum. Due to the fact that initially a smaller quantity is supplied, the solid cake still has adequate time to drain and therefore to solidify. The initially smaller quantity supplied ensures that the pusher centrifuge does not flood and the liquid in the solid cake has already drained to such an extent that once again storage volume in the solid cake has become free and can be filled with liquid. There is no need to fear any solid cake compression with this procedure.

It is particularly advantageous that the smaller mixture quantity is at the most half the quantity of the subsequently supplied mixture. On respecting this quantity ratio it is possible for the solid cake to drain sufficiently and achieve the desired strength.

It is advantageous for the mixture supply to be regulated by at least one valve. As a result of this constructionally simple further development of the invention the valve is placed in the supply pipe appropriately as close as possible to the drum, so as to avoid any mixture after-flow. The valve can be constructed as an electromagnetically operated valve to which control pulses are supplied, which are derived from the position or actuating pressure of the pusher plate.

It is also advantageous for the valve to be controlled as a function of the actuating pressure of the pusher plate. The valve can be constructed as a pressure-operated valve, which is linked by means of pressure lines to the pusher plate hydraulics. The pusher plate actuating pressure fluctuates with the different pusher phases in the pusher cycle and therefore, like the pusher plate position, is ideally suitable for controlling the mixture supply.

It is also appropriate for the mixture to be supplied by a discontinuously operating feed pump, which is operated synchronously with the pusher cycle. This avoids problems which could occur when using valves, e.g. the thickening of the mixture, the clogging of the valve, etc.

Appropriately during the supply phase the mixture is supply via a feed pipe with at least two separate channels, whereof at least one channel is connected to an additional mixture supply. Through the use of a specifically set control valve the supply can also take place in such a way that switching occurs between a larger and a smaller supply.

This can be achieved in an inventively operated pusher centrifuge in that in the feed pipe at least one channel is connected to a additional mixture supply. Whilst one channel is used for the continuous mixture supply, a control valve is provided in the other channel and serves for an additional mixture supply. Thus, in the phase still critical for mixture reception less mixture is supplied, whereas in the phase particularly favourable for mixture reception an increased mixture supply takes place.

In a further development of this arrangement a hydrocyclone is connected upstream in both channels, the hydrocyclone underflow serving as a continuous mixture supply and the hydrocyclone overflow as an additional mixture supply. The continuously supplied mixture is consequently enriched with solids and can therefore be better handled during the critical phase for mixture reception. The mixture reception capacity during the phase favourable for mixture reception can be so high that the mixture supply not enriched with solids can be connected in from the hydrocyclone overflow. This also leads to a rise in the pusher centrifuge throughput.

An additional mixture supply regulation can take place in simple manner if on the pusher centrifuge is provided a primary element of the position or for the pressing pressure of the pusher plate and if the additional supply is controllable by the test signal. The latter can be used for operating valves or additionally functioning pumps and by a control logic both the opening/-closing ratio of the mixture supply and the phase position of the opening/closing cycle can be controlled in relation to the pusher plate cycle. This is e.g. necessary if a longer feed pipe portion is positioned between the control valve and the additionally operating feed pump and the drum and mixture after-flow must be taken into account by corresponding upstream control times.

Whereas the Experts attempted to keep as short as possible the reversal times of the pusher plate at the rear and forward dead centre, according to a preferred embodiment of the invention a rest period for the pusher plate is deliberately introduced at the rear dead centre, when the solid cake which has built up on the perforated drum has a time and opportunity to be dehumidified and at the same time solidified.

The invention makes use of the finding that the continuous and constant movement of the pusher plate, during which in the conventional operation of a pusher centrifuge the forward movement of the pusher plate directly follows on to the preceding reverse movement, is not necessarily particularly favourable for a high solid throughput. The invention in fact teaches that after the filling of the pusher centrifuge and a partial filtering of the free water, a certain time must be given to the cake to further dehumidify and solidify before the pusher plate is moved forward again. If, according to the invention, following an adequate solidification of the cake the forward movement of the pusher plate is recommenced when the shear strength of the cake has become so large that it can be slid down from the perforated drum as a block and without compression, this leads to the advantage of an extremely high throughput, that the cake can be slid from the perforated drum with a relatively low force and that simultaneously there is a low residual moisture content. The necessary rest time to be respected according to the invention can, according to a preferred embodiment, either take place when the pusher plate is in its reverse movement or, after a rapid movement of the rear dead centre the pusher plate can be stopped during this rest time.

The invention is described in greater detail hereinafter relative to the drawings, wherein show:

FIG. 1 A longitudinal section through a pusher centrifuge.

Figure 2:
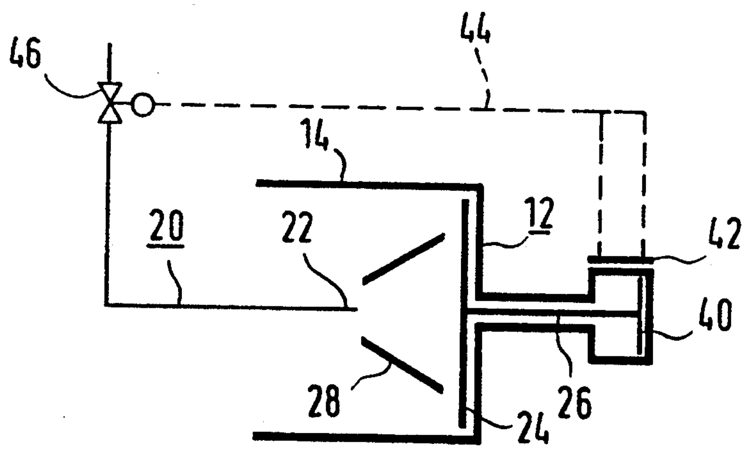

FIG. 2 A highly diagrammatic arrangement with the pusher centrifuge according to FIG. 1.

Figure 3:
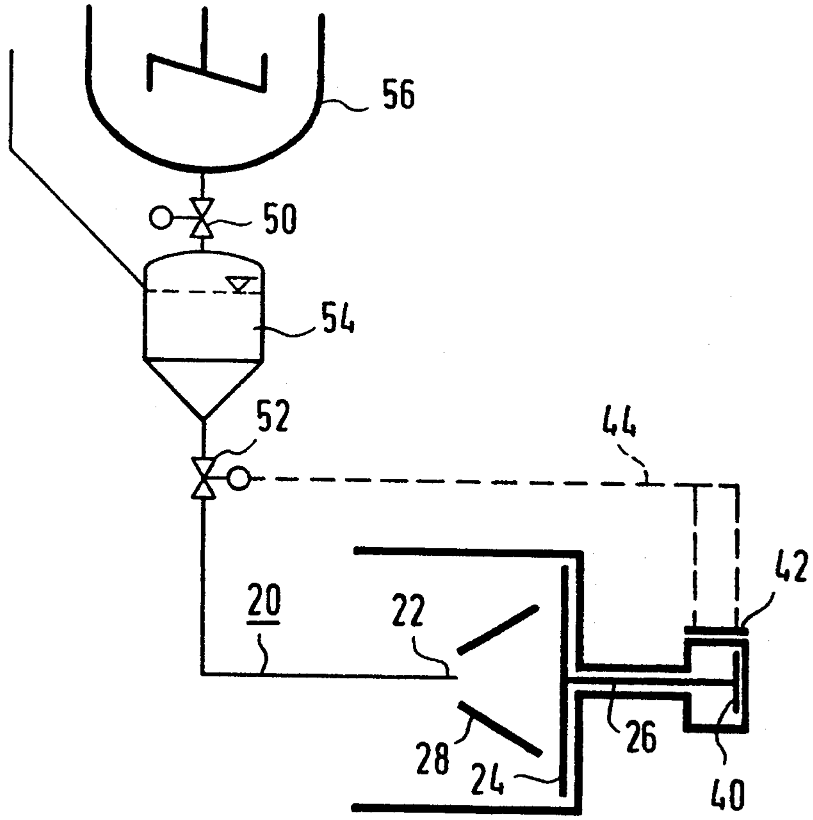

FIG. 3 An arrangement according to FIG. 2 with separate valves for the quantity control and the time control of the mixture supply.

Figure 4:
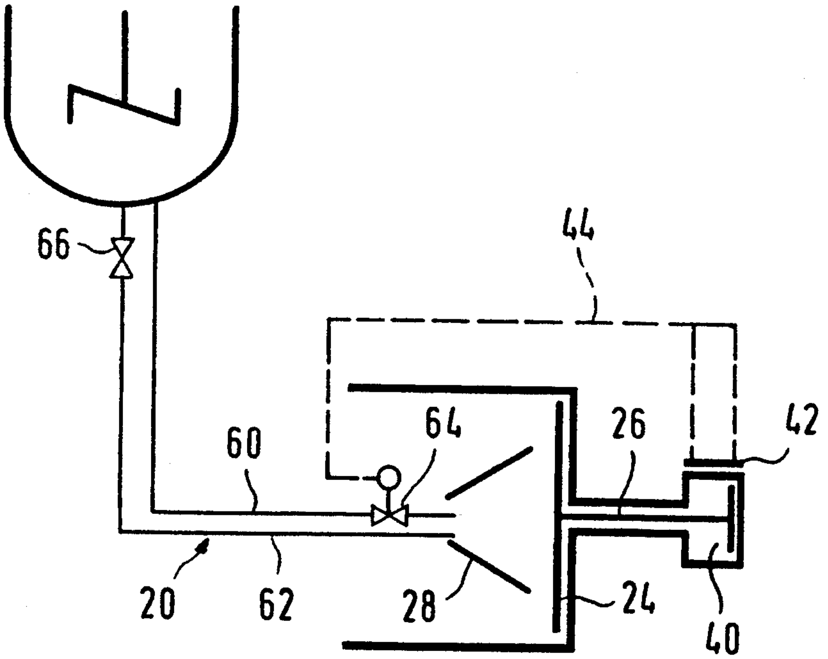

FIG. 4 An arrangement according to FIG. 2 with a combined continuous and discontinuous mixture supply during the feed phase.

Figure 5:
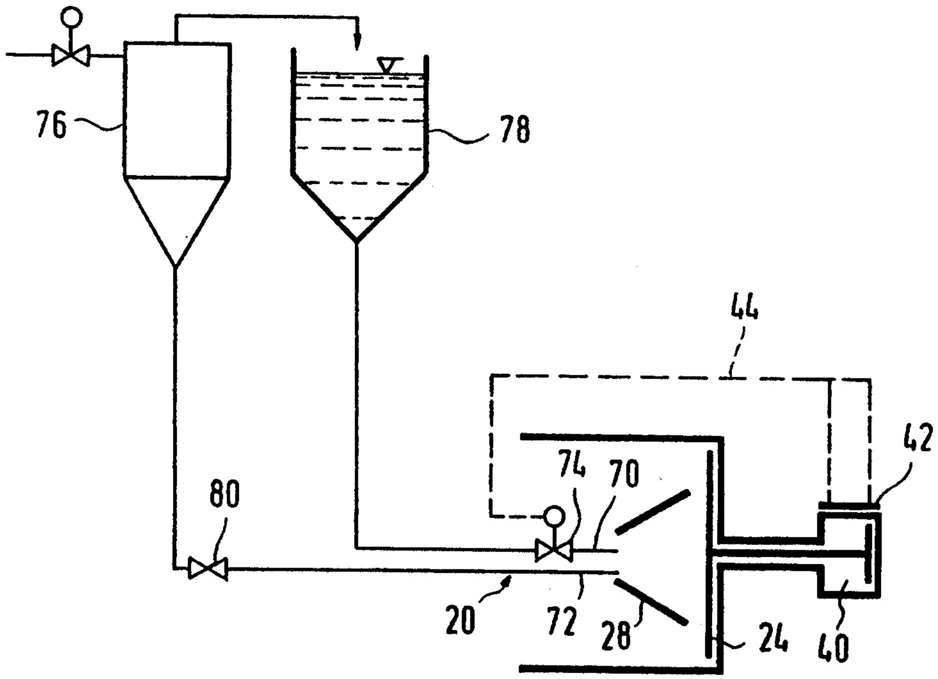

FIG. 5 An arrangement according to FIG. 4 with an upstream hydrocyclone.

Figure 6:
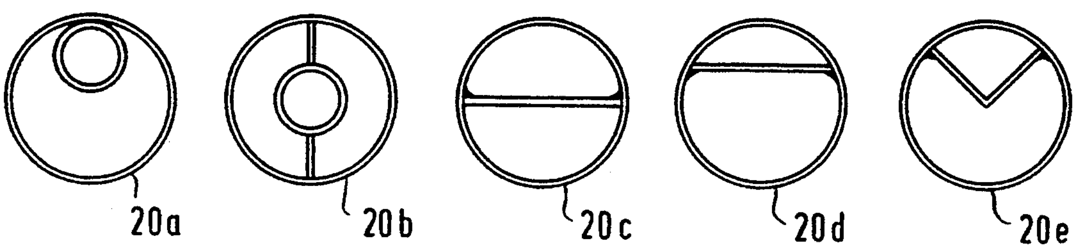

FIG. 6 Cross-sections through different embodiments for feed pipes with two channels.

Figure 7:
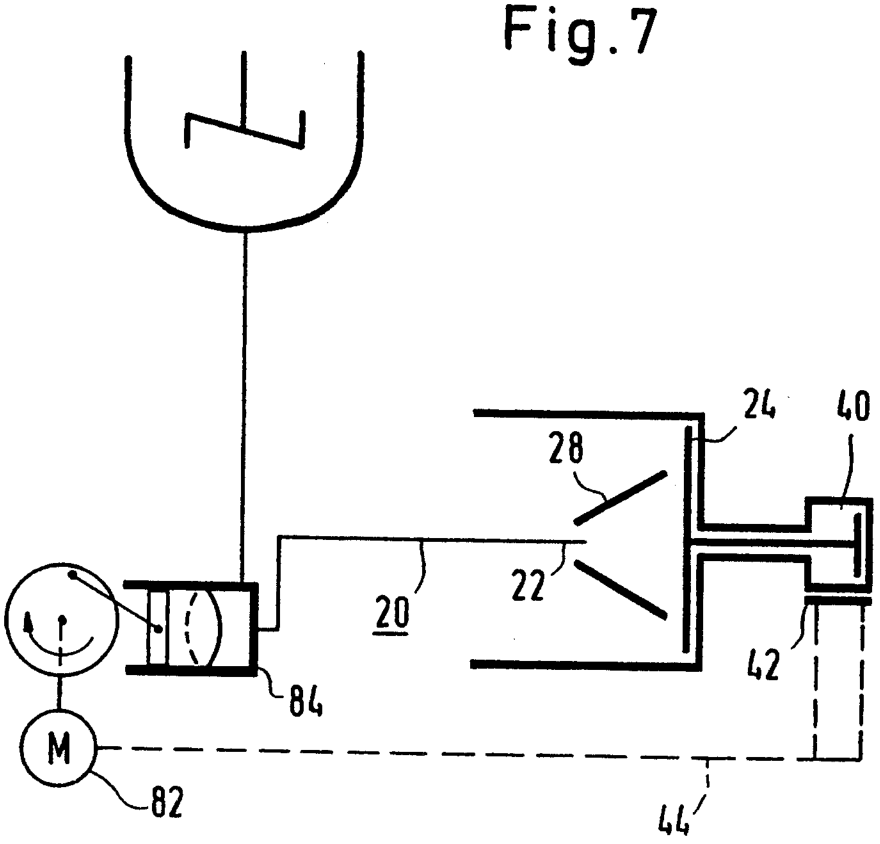

FIG. 7 An arrangement according to FIG. 2 with a discontinuously operating piston diaphragm pump as a mixture supply member.

Figure 8:
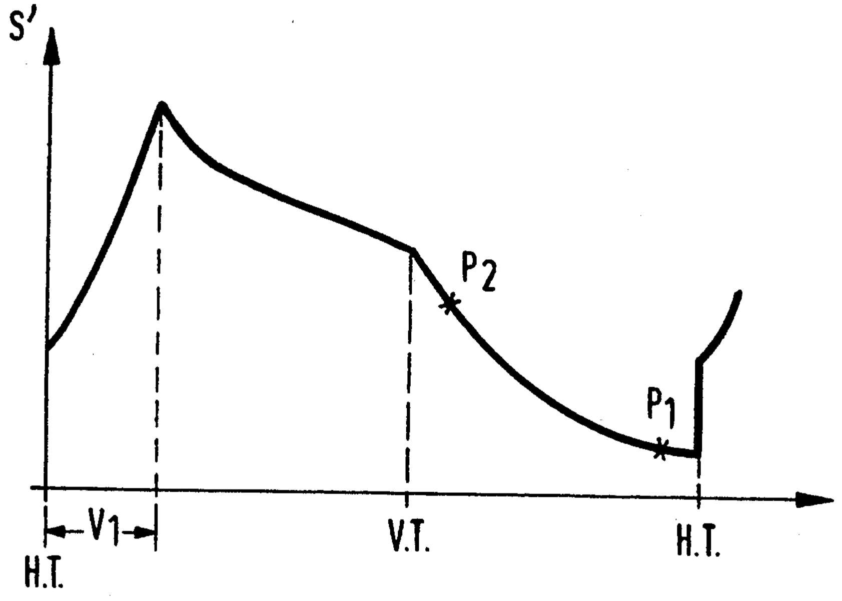

FIG. 8 The application of the pusher force of the pusher plate over a pusher period.

FIG. 1 shows a pusher centrifuge 10 for illustrating the operation during the separation of a mixture or a suspension. The pusher centrifuge 10 contains a transmission 12 rotatable about the axis A for a perforated basket or drum comprising two, axial cylinder portions 14, 16. The first cylinder portion 14 is constructed as a circular cylinder and is connected to the suspension 12 via the drum rear wall 17. A conically widened, second cylinder portion 16 is connected to the open side of the first cylinder portion 14. On the inside of the portions 14, 16 are provided wedge-wire screens 18 for separating the mixture into solids and filtrate. The filtrate penetrates radially the openings formed in the drum 14, 16 and thus enters a filtrate chamber 32. Drum 14, 16 has a feed pipe 20 for the mixture supply and is arranged axially to the drum 14, 16 in the final portion 22. A radially extending, funnel-shaped pusher plate 24 is arranged on the end of the drum 14, 16 facing the drum rear wall 17 so as to rotate together therewith. The edge of the pusher plate 24 terminates substantially with the inner wall of the first cylinder portion 14. The pusher plate 24 is axially displaceable relative to the drum 14, 16 by means of a hydraulically operated pusher rod 26. To the pusher plate 24 is connected an axially positioned feed hopper 28 widened conically thereto and whose smaller diameter end 30 engages round the axial portion 22 of the feed pipe 20 and is axially displaceable with respect thereto. The drum 14, 16 is surrounded by the filtrate chamber 32 with a filtrate outlet 34, which collects the filtrate flowing through the drum 14, 16. The drum 14, 16 is open towards the side remote from the drum rear wall 17 and said open side is surrounded by a collecting chamber 36 for the filter cake.

The feed pipe 20, 22 supplies the rotating drum 14, 16 with a mixture or suspension to be separated. The supplied mixture is accelerated in the rotary direction of the drum 14, 16 in the feed hopper 28. Between the pusher plate 24 and the feed hopper 28 the mixture enters the drum 14, 16 where, due to the high centrifugal force, separation takes place of a solid and a filtrate, the filtrate passing through the wedge-wire screens 18 and the drum walls into the filtrate chamber 32. A filter cake forms on the inside of the drum 14, 16 and through the advance of the cyclicly axially moved pusher plate 24 is pushed with a frequency of e.g. 1 Hz to the open side of the drum 14, 16 into the collecting chamber 36. During the return movement of the pusher plate 24 directly upstream thereof once again a screen area of the drum portion 14 is exposed and is flooded by the inflowing mixture. A new filter cake again forms at this point. An advance of the filter cake during an advance of the pusher plate 24 occurs if the new formed filter cake has sufficiently solidified. The pusher force of the pusher plate 24 overcomes the static friction of the filter cake on the drum 14, 16.

The absorptivity of the filter cake for a new mixture is at the earliest present during the last portion of the pusher phase. The new formed filter cake is compressed during the forward travel of the pusher plate 24. In this phase the absorption capacity of the filter cake for a new inflowing mixture is very low, so that generally there is a supersaturation of the filter cake with the mixture. As a result of this supersaturation of the gap between the solid particles with liquid, the internal cohesiveness of the filter cake is largely lost, so that the cake accumulates to a greater thickness and part of the mixture can flow along the cake surface directly into the collecting chamber 36. The accumulation of the filter cake to greater thicknesses once again influences the operating parameters of the pusher centrifuge in an unfavorable manner, so that e.g. only low rotation speeds can be used for the pusher centrifuge.

Account is taken of the different filter cake absorption capacity of the drum 14, 16 in that the mixture is not constantly supplied, the supply periods being synchronized with the position of the pusher plate 24.

During the forward travel of the pusher plate 24 and/or during the reverse movement, the mixture supply can be interrupted or recommenced. An equal quantity mixture supply is most favorable if the pusher plate 24 has left the forward dead centre and in the most favourable case only lasts until the plate has not quite reached the dead centre. In the case of an unequal quantity mixture supply, a lower mixture quantity can be supplied when the pusher plate 24 has not quite reached the forward dead centre. This leads to a stable filter cake, which has drained adequately and therefore reached an adequate strength level. In addition, a low, specific filter cake thickness and a homogeneous cake consistency are achieved, which allow higher rotation speeds of the pusher centrifuge and consequently a higher mixture throughput.

The following drawings show the pusher centrifuge according to FIG. 1 in highly diagrammatic form in an operating arrangement, identical parts being given identical reference numerals.

FIG. 2 shows an arrangement for the synchronization of the interrupted mixture supply with the pusher movement of the pusher plate 24. On the hydraulic drive mechanism 40 for the pusher rod 26 of the pusher plate 24 is located a primary element 42, which determines either the position of the pusher plate 24 or the operating pressure in the drive mechanism 40. A corresponding test signal is supplied via a control line 44 to a control valve 46 positioned in the feed pipe 20. The test signal can be an electric signal, which is transformed by not shown electronics into opening and closing signals and is supplied by the control valve 46 constructed as an electromagnetic valve.

In the simplest case the control lines 44 can be pressure lines which directly supply the operating pressure in the hydraulic mechanism 40 of the pusher plate 24 to a pressure control chamber of a pressure-operated control valve 46.

Whereas in the arrangement shown in FIG. 2 the control valve 46 controls both the mixture inflow time and quantity, in the arrangement according to FIG. 3 two separate valves 50, 52 are used for this. The control valve 52 is responsible for the timing of the mixture supply and, like the control valve 56 in FIG. 2, is connected via control lines 44 to the primary element. However, a regulating valve 50 is positioned upstream of the control valve 52. Between the two valves 50, 52 there is a buffer volume 54 which, at the time of opening the control valve 52 has a maximum filling level and which is completely emptied on closing the control valve 52. The buffer volume 54 is connected to the atmosphere or to a pressurized reception container 56.

The control valves 46 and 52 of FIGS. 2 and 3 can also be operated in such a way that they open in constricted form in the opening phase and have a complete opening in the closed phase and consequently permit a reduced supply in the initial phase. In this way the supply can be set to a value during the advance of the pusher plate 24 which just fails to lead to a liquid saturation of the filter cake.

According to FIG. 4 this is also possible with two channels 60, 62 located in the feed pipe 20. The first channel 60 contains a control valve 64 for an additional mixture supply in the feed phase. The second channel 62 contains a regulating valve 66 for setting a constant mixture flow in the feed phase. As a result of this arrangement the mixture supply in the feed phase is switched between a lower and a higher inflow rate.

As in FIG. 4, the arrangement according to FIG. 5 has two channels 70, 72 in the feed pipe 20 and the control valve 74 for a timed mixture supply is located in the first channel 70. However, prior to subdivision into the two channels 70, 72, the mixture passes through a hydrocyclone 76, whose underflow is connected to the second channel 72 and whose overflow leads via a reception container 78 to the first channel 70. This has the advantage that the mixture constantly flowing in during the feed phase and which is also supplied in the mixture reception unfavorable phase of the forward movement of the pusher plate 24, has already enriched with solids, so that in this phase less liquid is removed from the mixture into the filtrate chamber 32. During the reverse movement of the pusher plate the control valve 74 opens. During this phase the reception capacity of the filter cake and the drum 14, 16 for a new mixture is very high, so that also the solid-depleted mixture from the overflow of the hydrocyclone 76 can be handled, accompanied by the formation of a stable, undersaturated filter cake. The valve 80 switches off the mixture supply in the non-feed phase.

FIG. 6 shows two possible embodiments for a feed pipe 20 containing two channels. The weld for the separation of the two channels need not be absolutely tight, because the separation of the channels only serves to prevent a reciprocal interaction of the feed flows. This interaction would occur if two channels issued without subdivision into a feed pipe 20, because then in the case of a mixture flow flowing through the flow resistance for a second mixture flow would increase. Such interactions between the supplies are undesired due to the undefined behaviour.

FIG. 7 shows an arrangement according to FIG. 2, in which the control valve 46 is replaced by a discontinuously operating piston diaphragm pump 80 upstream of the feed pipe 20. The drive motor 82 of the pump 80 is timed by control pulses, which are supplied to the motor 82 by the primary element 42 via the control line 44. This allows a synchronization of the mixture supply with the pusher cycle of the pusher plate 24 without using valves.

FIG. 8 shows the pushing force corresponding to the actuating pressure of the pusher plate 24 over a pusher cycle. The rear dead centre corresponds to the retracted position of the pusher plate 24. During the forward travel of the pusher plate 24 the pusher force S' rises strongly during an initial time $V_1$ until the static friction of the filter cake on the drum 14, 16 is overcome. This is followed by a slight reduction in the pusher force S' to the forward dead centre corresponding to the advanced position, because the contact face of the filter cake with the drum 14, 16 becomes smaller during the advance. The reverse movement of the pusher plate 24 commences at the forward dead centre, so that the pusher force S' drops considerably. For the control with pressure lines in accordance with FIG. 2, it is possible to use a specific release pressure point according to the pressure path shown in FIG. 8. A pressure-operated control valve 46 is set in such a way that it closes at $P_1$ and opens at $P_2$. Shortly following the reverse movement of the pusher plate, the control valve 46 is opened at $P_2$ and closed on reaching $P_1$. Through the upstream positioning of the points $P_1$ and $P_2$, any afterflow of mixture in the feed pipe 20 between the control valve 46 and the drum 14, 16 can be prevented.

I claim:

1. A process for operating a pusher centrifuge to form a solid cake from a quantity of material mixture, the pusher centrifuge including a rotating pusher plate and a perforated drum axially aligned with the pusher plate, comprising the steps of:

(a) continuously moving the pusher plate relative to the perforated drum in an axial direction in a cycle between an advanced position and a retracted position in a forward movement or a reverse movement substantially without pause when the direction of movement is reversed, the reverse movement including a first portion, a second portion immediately following the first portion, and a third portion immediately following the second portion;

(b) supplying all of the material mixture during the second portion of the reverse movement;

(c) partially dehumidifying the material mixture in the perforated drum by centrifugal separation due to rotation of the perforated drum, during said step (b), to form a solid cake; and (d) following said step (c), sliding the solid cake from the perforated drum using the pusher plate during the forward movement to the advanced position.

2. The process according to claim 1, wherein in said step (a), the first, section, and third portions of the reverse movement are substantially equal.

* * * * *